United States Patent Office 3,441,496
Patented Apr. 29, 1969

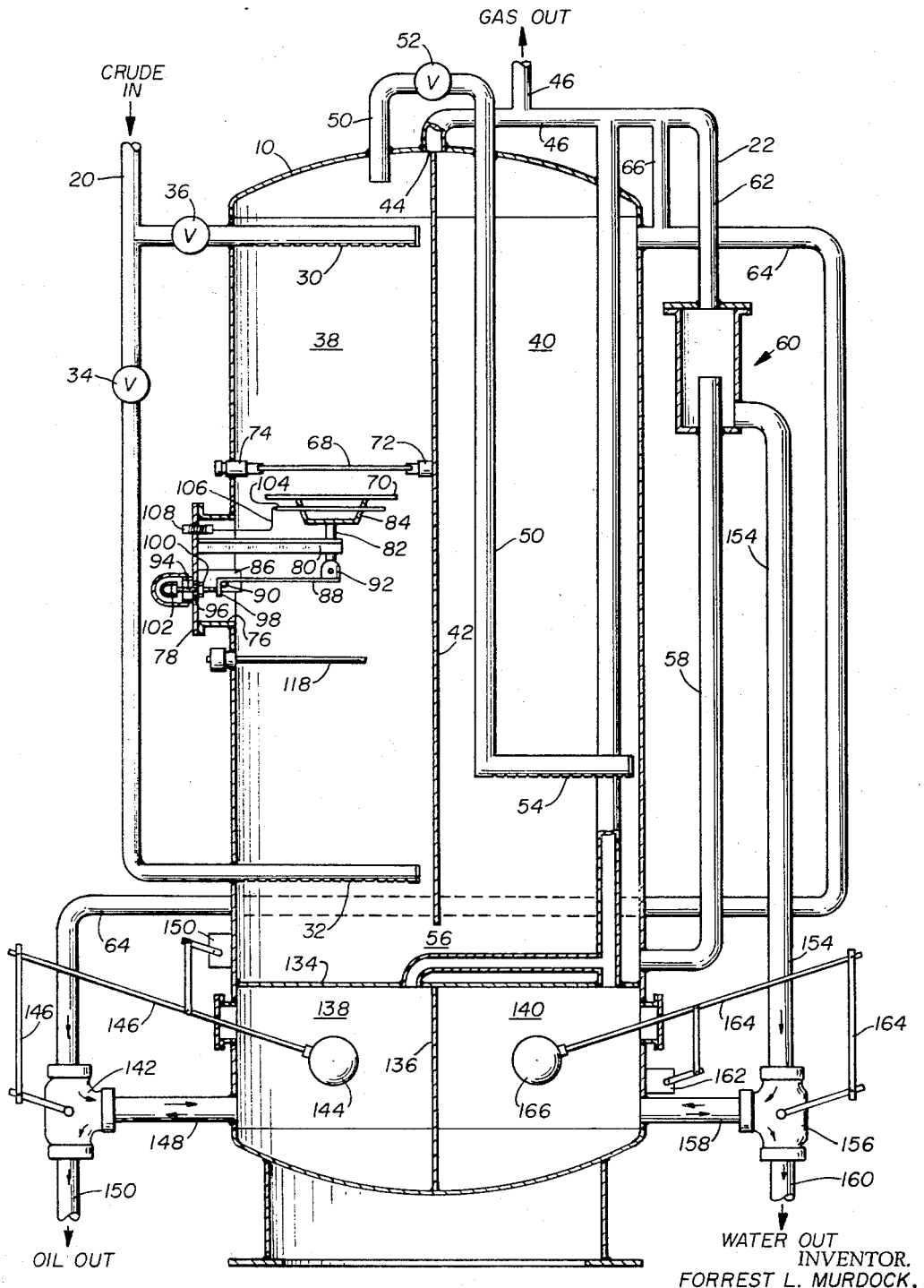

3,441,496
ELECTRIC TREATER REGULATED BY A WATER-CONTENT PROBE FOR TREATING CRUDE OIL EMULSIONS
Forrest L. Murdock, Sr., 2420 E. 24th St., Tulsa, Okla. 74114
Filed Sept. 15, 1966, Ser. No. 579,533
Int. Cl. B03c 5/02; C10g 33/02
U.S. Cl. 204—304          11 Claims

ABSTRACT OF THE DISCLOSURE

An electric treater for treating petroleum crude emulsions includes a closed vessel with an emulsion inlet; oil, gas and water outlets, an electric grid system within the vessel in the path of liquid flow for imparting an electric field potential between grids. A heater adjacent the grid system raises the temperature of the grids. The spacing between grids may be varied and means are provided for deenergizing the electric grids when the water content of the emulsion exceeds a certain limit. Metering chambers are sequentially filled and emptied and counters are provided to record filling and emptying cycles. Relay means actuated by water-content probes regulates the temperature of the emulsion and automatically interrupts the voltage to the grid system when excessive water content occurs.

This invention relates to methods of treating petroleum crude emulsion and to an electric treater for crude oil. More particularly, the invention relates to an electric treater for use in conjunction with a standard heater-treater as used to separate entrained water and gas from crude oil.

In the petroleum industry most crude as it is raised from beneath the earth's surface, includes relative large amounts of entrained water and gas. One of the first processes to which most crude is subjected is that of removing as much as possible of the entrained water and gas and for this purpose the most common method of treatment is the use of a heater-treater. Basically, a heater-treater is a device which subjects the crude to quiescent settling zones permitting the gas to rise therefrom and water to settle out. In addition, to decrease the viscosity and thereby permit the water settlement and gas escape to take place more freely and completely, heating devices are employed in the quiescent settling zone. In the oil industry today, there is in use a large number of such heater-treaters.

This invention provides methods of treating crude oil to augment the separation of entrained water and gas therefrom. The invention provides devices particularly for use in conjunction with heater-treaters to further improve the effectiveness of the removal of entrained water and gas from crude. The device of this invention includes means of subjecting the crude after it flows from a heater-treater to an electric field wherein entrained water droplets are caused to coalesce and settle out of the crude.

The methods and devices of this invention have important economic advantages in that they provide a means for the utilization and of an electric field to augment water and gas separation from crude oil without the necessity of replacing existing heater-treaters, resulting at great savings to the oil producer.

It is therefore an object of this invention to provide improved methods of treating petroleum crude emulsion to remove entrained water and gas therefrom.

It is another object of this invention to provide an electric treater for use in removing entrained water and gas from crude.

More particularly, an object of this invention is to provide an electric treater for removing water and gas from crude, the treater being particularly adaptable for use in conjunction with existing heater-treaters.

Another object of this invention is to provide an electric treater for use in removing entrained water and gas from crude oil adaptable for use in conjunction with a heater-treater and including means of controlling the temperature of the heater-treater for most efficient removal of entrained water and gas at a minimum treater temperature.

Another object of this invention is to provide electric treater for removal of entrained water and gas from crude oil including means of deenergizing the electric treater when the water content of the crude oil passing through the treater exceeds a predetermined level.

Another object of this invention is to provide an electric treater for removing entrained water and gas from crude oil including means of metering the separated oil and water.

These and other objects will be understood from the following description and claims, taken in conjunction with the attached drawings in which:

FIGURE 1 is an external view of the electric treater of this invention as applied to augment the water and gas separation of crude oil in conjunction with separate heater-treater. This view further shows a circuit diagram including means of deenergizing the electric field of the electric treater when the water content of the crude flowing through the electric field exceeds a predetermined level and means of controlling the temperature of the heater-treater so as to increase the temperature thereof when required to remove the additional entrained water from the crude by increasing the temperature of the heater-treater.

FIGURE 3 is a cross-sectional view of an alternate embodiment of the electric treater of this invention showing the electric treater having an integral metering system for measuring the quantity of oil and water flowing out of the treater.

FIGURE 4 is a cross-sectional view taken along the line 4—4 of FIGURE 2.

Figure 1:
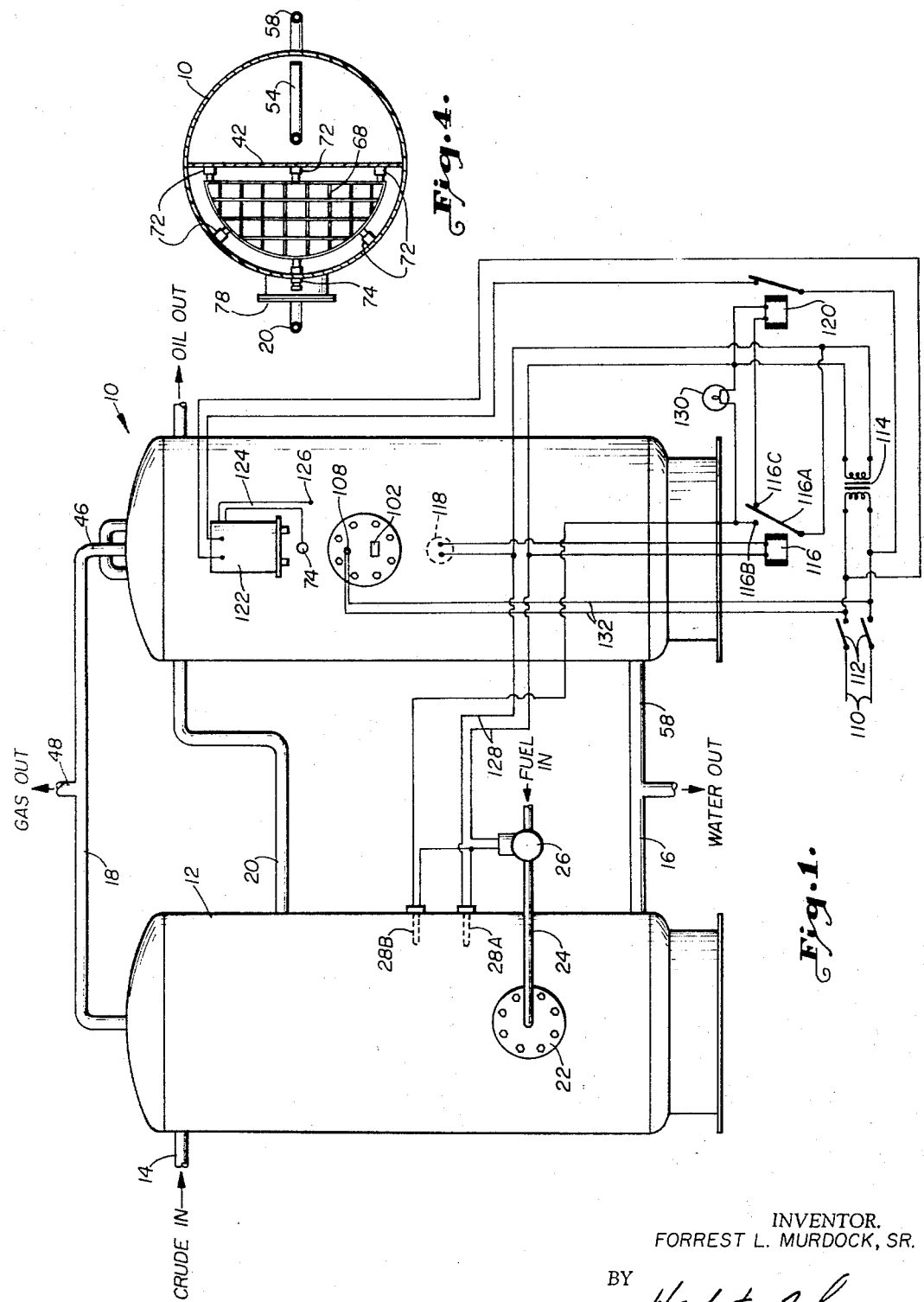

Referring now to the drawings and first to FIGURE 1, the electric treater of this invention is generally indicated by the numeral 10 and is shown as it is utilized in conjunction with a standard heater-treater 12. Crude oil produced from the earth flows into the treating system through pipe 14. Within the heater-treater 12 a substantial portion of the entrained water is separated out and flows out through pipe 16. Gas separated from the crude oil flows out of the heater-treater 12 through gas pipe 18. Crude oil with a substantial portion of the entrained water and gas having been extracted therefrom, passes out of the heater-treater 12 through oil outlet pipe 20. Normally the oil from outlet pipe 20 passes onto a pipe line or storage facilities where it is later transported for processing. This invention provides an electric treater for use in treating the oil from pipe 20 to more effectively extract the entrained water and gas therefrom.

Heater-treater 12 includes a heat 22 typically fired by gas through fuel pipe 24, the fuel being controlled by a valve 26 in response to a thermostat 28 by which the heat of the crude emulsion within the heater is maintained within a preselected range.

Figure 2:
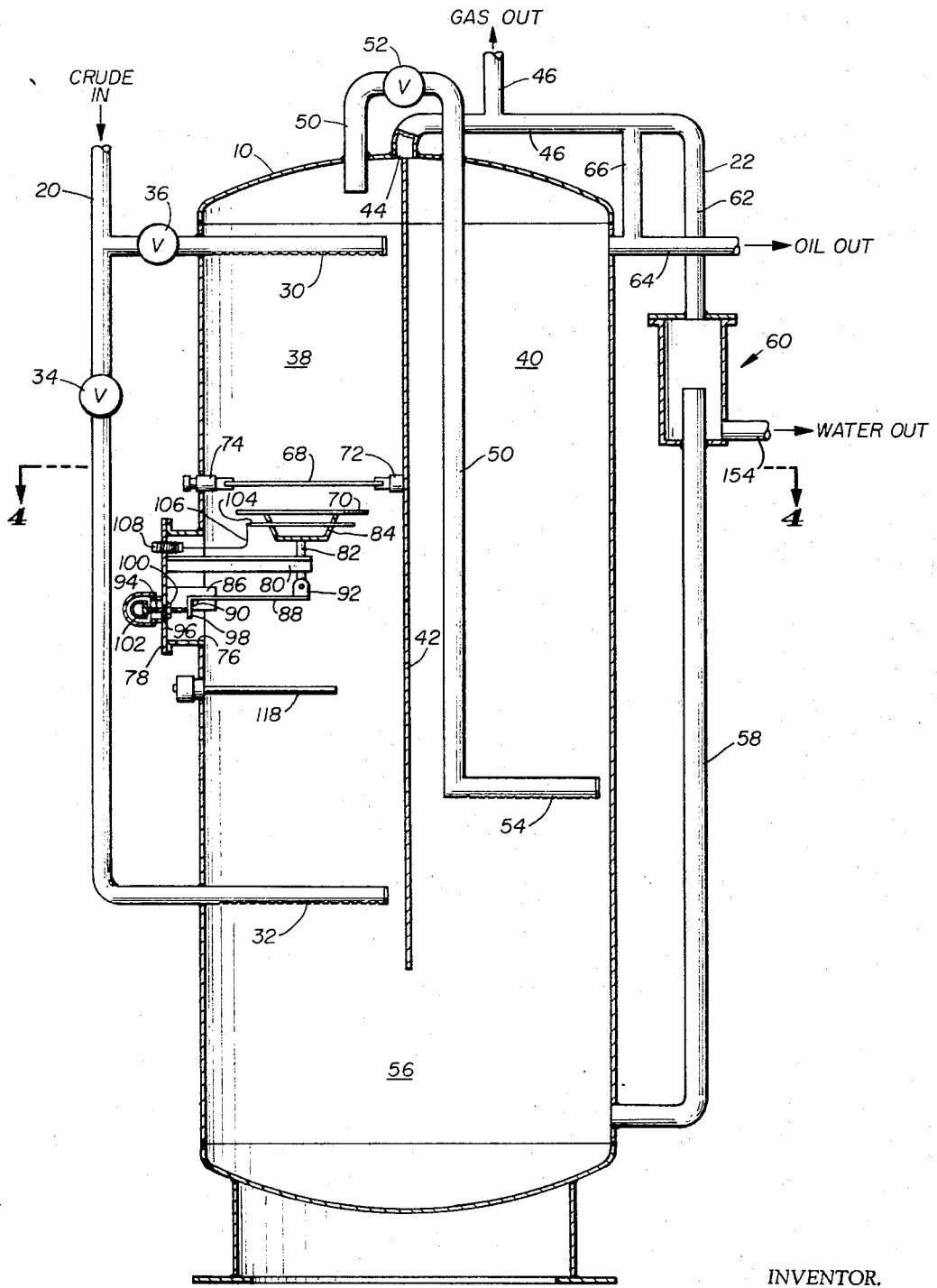
FIGURE 2 is a cross-sectional view of one embodiment of the electrical treater of this invention.

Referring to FIGURE 2 the electric treater of this invention is better illustrated. Crude oil, as previously indicated, flows into the treater through pipe 20. A feature of the invention is the provision of means whereby the oil may be treated to extract water and gas therefrom by either the upward or downward flow process. A top oil inlet pipe 30 conveys crude in the pipe 20 to the top interior of the treater 10. In addition, crude inlet pipe 20 extends to a lower oil inlet 32. A valve 34 is positioned in series with the lower oil inlet 32 and similarly, a valve 36 is in series with the upper oil inlet 30. When it is desired that the electric treater of this invention functions as a "downflow" treater the valve 34 is closed and valve 36 is opened. This causes crude to flow into the treater through top oil inlet pipe 30. Contrarily when it is desired that the treater functions as an "upflow" treater, valve 36 is closed and valve 38 is open so that oil flows into the treater through lower oil inlet pipe 32.

Dividing the vessel 10 into a first treating zone 38 and a quiescent zone 40 is a vertical partition 42 which extends from the interior top of the vessel and terminates near the bottom thereof. In the top of the vessel is a gas outlet opening 44 which communicates from either side of the partition 42, that is, with both the treating zone 38 and the quiescent zone 40. Gas escaping from the crude oil in either zone 38 or 40 rises to the top and passes out of the treater through gas outlet pipe 46 which, as shown in FIGURE 1, may connect with the gas outlet pipe of the heater-treater 12 to provide a common gas outlet 48.

A flow passage pipe 50 extends from the top of the vessel 10 through a valve 52 and back downwardly into the vessel terminating in the lower portion of quiescent zone 40. A spreader 54 is provided to distribute fluid passing downwardly through the pipe 50 evenly across the lower portion of the quiescent zone 40.

Valve 52 is utilized in conjunction with valves 34 and 36 to vary the method of operation of the electric treater 10. When it is desired that treater functions to treat on the downflow of fluid, valve 34 is closed, valve 36 is opened, and valve 52 is closed. This causes the fluid to pass through top oil inlet 30 into the upper part of treating zone 38 and to pass downwardly therethrough. To reverse the flow direction valve 36 is closed, valve 34 is open and valve 52 is open. In this arrangement crude oil flows downwardly through valve 34 and lower oil inlet 32 passes upwardly in the treating zone 38, out the top of the vessel through flow passage pipe 50 and thence downwardly in the quiescent zone, the fluid being discharged in the lower portion of the quiescent zone 40 through spreader 54.

Lower portion of vessel 10 forms a water collection zone 56. Water coalescing and falling out of suspension in both the treating zone 38 and quiescent zone 40 fall downwardly and collect in the water treating zone 56 where it is carried out of the electric treater 10 through water outlet pipe 58. Water may be discharged from the electric treater 10 in a variety of ways. As illustrated in FIGURE 2 a syphon, generally indicated by the numeral 60, is utilized to remove water from the treater. The use of a syphon in petroleum treating is well known and therefore it is not of the essence of the invention. Generally a syphon is preferred in that it prohibits the possibility of all fluid being drained from the vessel. The syphon 60 is provided with an equalizing pipe 62 which communicates with the gas outlet pipe 46. Oil, having most of the entrained water and gas extracted therefrom, passes out of the treater through oil outlet pipe 64, also illustrated as having a pressure equalizer pipe 66 communicating with the gas outlet pipe.

An important provision of this invention is means of subjecting the crude oil treater in the electric treater to an electric field by means of a grid system. Basically, the system consists of a charged grid 68 which has impressed thereon an electric voltage potential relative to a ground grid 70 maintained at the potential of the vessel. Insulators 72 support the charged grid 68 and an insulated electrical connector 74 provides means of conducting an electric potential from the exterior of the vessel to the charged grid 68.

To afford means of installing, inspecting and calibrating the electrical grid system of this invention, an opening 76 is provided in the vessel 10 covered by a man-way cover 78. A supporting bracket 80 extends horizontally from the interior of the man-way cover 78 and provides means for supporting the ground grid 70. As shown, a vertically extending rod 82 has affixed at the upper end thereof a support frame 84 which supports the ground grid 70. Rod 82 is slidably supported by the support bracket 80.

A second bracket 86 extends from the man-way cover 78 below and parallel to the support bracket 80, the bracket 86 pivotally supporting a pivot arm 88, the arm being pivoted about pin 90 which extends from the bracket 86. The outer end of the pivot arm 88 has a vertical bracket 92 which is pivotally affixed at the lower end to the ground grid rod 82. A threaded bolt 94 extending through an opening 96 in the man-way cover 78 has the endward end thereof in engagement with a downwardly extending leg portion 94 of pivot arm 88. The bolt may be threadably supported in a variety of ways, such as by means of a threaded nut 100 welded to the interior of the man-way cover 78. The outer end of the bolt 94 is provided with a head 102 by means of which the bolt is easily threadably advanced or retarded.

It can be seen that by threadably positioning bolt 94, the angle relative to the horizontal of pivot arm 88 is varied and thereby the elevation of the ground grid 70 is varied to change the spacing between the charged grid 68 and ground grid 70. In this way, the intensity of the electric field, which is generally inversely proportional to the distance between the grids, is thereby adjustable.

An additional element of this invention is the provision of means of preventing the accumulation of paraffin on the grids 68 and 70. This is accomplished by supporting a heating element 104 directly below the ground grid 70. The heating element is connected to an electric source by a conductor 106 which extends to an insulator connector 108 in the many-way cover 78. When it is necessary to remove paraffin from the grids the heating elemnt 104 is energized, heating the grids to melt the paraffin accumulated thereon.

An additional part of the invention is the provision of means of safeguarding the electrical grid system by controlling the electrical potential supplied to the charged grid in such a manner that the grid potential is automatically discontinued when the water content of emulsion being treated approaches that which would short circuit the grid elements. By a short circuit is meant that the water content, which directly effects the conductivity of the emulsion, becomes so high that the current flow between the grids 68 and 70 exceeds the current carrying potential of the electrical facilities supplying the grid system. This system of automatically interrupting the voltage to the grid system when excessive water content occurs is illustrated in the circuit diagram of FIGURE 1. Voltage is supplied to the grid system by means of conductors 110. Circuit breaker 112 provides a means of energizing or deenergizing the electrical grid systems. A low voltage transformer 114 is energized when circuit breakers 112 are closed, the secondary of the low voltage transformer 114 providing voltage to energize a relay 116. Relay 116 includes a clapper arm 116A and contacts 116B and 116C. In series with the relay 116 is a capacitance probe 118 (see also FIGURE 2) which is responsive to the water content of the crude oil emulsion. The capacitance probe 118 is positioned in the electric treater directly below the grid system so that the water content of the emulsion passing through the grid system is detected. The capacitance probe 118 is a standard item of equipment utilized in the petroleum industry, especially in automatic custody transfer equipment. The capacitance probe functions to provide a high resistance circuit when the water content of the emulsion is above preselected level. As long as the probe 118 has a high resistance the relay 116 is non-actuated so that continuity is provided between relay contacts 116C and clapper arm 116A, energizing relay 120. With relay 120 closed voltage is supplied to a transformer 122 which steps up the voltage and provides a high voltage through conductors 124 to the grid system. Specifically, one of the conductors 124 is attached to the electrical connector 74 communicating with the charged grid 68 and the other conductors 124 is attached to a ground point 126 so that transformer 122 applies voltage between the charged grid 68 and the vessel 10, and since the ground grid 70 is at vessel potential an electric field is created between the charged grid 68 and ground grid 70.

When the percentage of entrained water in the crude being treated is low, the capacity probe 118 has high resistance and the circuit is in the condition, shown in FIGURE 1. In this condition voltage is applied through conductors 128 to the gas control valve 26 in series with low temperature thermostat 28A. This maintains a preselected range of temperature of the emulsion in the heater-treater 12.

When the conductivity of the emulsion being treated in electric treater 10 rises, the capacitance probe 118 reduces in resistance to a point where relay 116 energizes. This has several effects. First, it deenergizes relay 120 to remove voltage from the electric grid system, thereby preventing short circuiting between the grids. At the same time warning light 130 is illuminated. In addition, clapper arm 116A moves from contact 116C to 116B taking the low temperature probe 28A out of the circuit and high temperature thermostat 28B is placed in series with gas valve 26. Thus, when high water conductivity is detected the electric field is deenergized, the warinng light 130 is turned on, and the heater-treater 112 is automatically actuated to heat the emulsion therein to a higher temperature to increase the rate of water separation from the crude in heater-treater 12. Thus, the system of this invention functions to protect the electric grid system by preventing it form being shorted by high water percentage in the crude being treated and, at the same time, to automatically increase the temperature of the heater-treater to remove the excess water.

As shown in the circuit diagram of FIGURE 1, conductors 132 conduct electrical potential to the insulator 108 and thereby to the heating element 104 so that the grids 68 and 70 are maintained at a warm temperature preventing paraffin accumulation thereon.

Referring to FIGURE 3 an alternate embodiment of the invention is shown. The electric treater works the same as illustrated in FIGURES 1 and 2 except that a horizontal partition 134 is formed below the water collection zone 56. The area below the horizontal partition 134 in divided by a vertical portition 136 into an oil metering chamber 138 and a water metering chamber 140. Oil outlet pipe 64 communicates with a three-way valve 142 which is controlled by float 144 and linkage 146. In the downward position of float 164 the valve is actuated so that the flow of fluid passes from pipe 64 through valve 142 and pipe 148 into the oil metering chamber 138. When the chamber 138 is filled the valve 142 is actuated by float 144 and linkage 146 to block the flow of fluid from pipe 64 and at the same time to permit the fluid to flow from chamber 138 outwardly through pipe 148 and valve 142 to oil outlet pipe 150. As the fluid in the metering chamber 138 is emptied the float 144 is moved downwardly to a point actuating the valve 142 to close communication with outlet pipe 150 and again causes fluid to flow into the measuring chamber 138 until it is filled. Thus, each actuation of the linkage 146 is indicative of the filling and emptying of chamber 138. By means of a counter 152 the number of cycles of filling and emptying the chamber 138 is counted and thereby the total quantity of oil passing through the meter is detected.

In like manner water outlet pipe 154 connects through a two-way valve 156. Pipe 158 conducts fluid flow through valve 146 to and from the water metering chamber 140. A counter 162 actuated by the strokes of the linkage 164 connected to float 166 indicates the number of times the water metering chamber is filled and emptied, thereby metering the quantity of water passing out of the treater system.

It can be seen that the electric treater of FIGURE 3, functions to augment a standard heater-treater in two basic ways. First, it provides increased extraction of entrained water and oil from crude by subjecting the crude to an electric field. Second, it provides a metering system for detecting the quantity of water and oil produced which information is extremely useful to the petroleum industry.

While the invention has been described with a certain degree of particularity it is manifest that many changes may be made in the details of construction and the arrangement of components without departing from the spirit and scope of this disclosure.

What is claimed is:

1. An electric treater for treating petroleum crude emulsions, said electric treater comprising:
   a closed vessel having an emulsion inlet, a gas outlet in the upper portion thereof, a water outlet in the lower portion thereof and an oil outlet in the intermediate portion thereof, the interior of the vessel providing a treating zone;
   an electric grid system traversing the interior of said vessel in the path of fluid flow between said emulsion inlet and said oil outlet, said electric grid system including spaced electric grids;
   means of imparting an electric potential to said electric grid system whereby an electric field is established through which the crude emulsion flows; and
   an electric heating element adjacent said electric grid system whereby the temperature of said grid system may be elevated to melt any paraffin accumulation thereon.

2. An electric treater according to claim 1 wherein said electric grid system includes:
   a charged grid supported to the interior of said vessel in insulated relationship;
   an insulated conductor means in the wall of said vessel and connected interiorly of the vessel to said charged grid affording means of imparting an electric potential to said charged grid;
   a grounded grid paralleled to and spaced from said charged grid; and
   means of varying the spacing between said charged grid and said grounded grid.

3. An electric treater according to claim 1 wherein said vessel is partitioned to include, in addition to said treating zone, an oil metering chamber and a water metering chamber, said oil metering chamber and said water metering chamber each having an inlet and outlet opening therein communicating with said vessel crude oil outlet and water outlet respectively;
   means of sequentially filling and emptying said oil and water chambers; and
   means of indicating independently the number of times each of said metering chambers is filled and emptied.

4. An electric treater for treating pertoleum crude emulsions, said electric treater comprising:
   a closed vessel having an emulsion inlet, a gas outlet in the upper portion thereof, a water outlet in the lower portion thereof and an oil outlet in the intermediate portion thereof, the interior of the vessel providing a treating zone;
   an electric grid system traversing the interior of said vessel in the path of fluid flow between said emulsion inlet and said oil outlet, said electric grid system including spaced electric grids;
   means of imparting an electric potential to said electric grid system whereby an electric field is established through which the crude emulsion flows;

a water content probe within said vessel and adjacent said electric grid system; and means to deenergize said electric grid system when the water content of the emulsion therein exceeds a predetermined level.

5. An electric treater according to claim 4 wherein said electric grid system includes:

a charged grid supported to the interior of said vessel is insulated relationship;

an insulated conductor means in the wall of said vessel and connected interiorly of the vessel to said charged grid affording means of imparting an electric potential to said charged grid;

a grounded grid paralleled to and spaced from said charged grid; and means of varying the spacing between said charged grid and said grounded grid.

6. An electric treater according to claim 4 wherein said vessel is partitioned to include, in addition to said treating zone, an oil metering chamber and a water metering chamber, said oil metering chamber and said water metering chamber each having an inlet and outlet opening therein communicating with said vessel crude oil outlet and water outlet respectively;

means of sequentially filling and emptying said oil and water chambers; and means of indicating independently the number of times each of said metering chambers is filled and emptied.

7. An electric treater for treating petroleum crude emulsions, said electric treater comprising:

a closed vessel having an emulsion inlet, a gas outlet in the upper portion thereof, a water outlet in the lower portion thereof and an oil outlet in the intermediate portion thereof, the interior of the vessel providing a treating zone, said vessel being partitioned to include, in addition to said treating zone, an oil metering chamber and a water metering chamber, said oil metering chamber and said water metering chamber each having an inlet and outlet opening therein communicating with the vessel crude oil outlet and water outlet respectively;

an electric grid system traversing the interior of said vessel in the path of fluid flow between said emulsion inlet and said oil outlet, said electric grid system including spaced electric grids;

means of imparting an electric potential to said electric grid system whereby an electric field is established through which the crude emulsion flows;

means of sequentially filling and emptying said oil and water chambers; and means of indicating independently the number of times each of said metering chambers is filled and emptied.

8. An electric treater according to claim 7 wherein said electric grid system includes:

a charged grid supported to the interior of said vessel in insulated relationship;

an insulated conductor means in the wall of said vessel and connected interiorly of the vessel to said charged grid affording means of imparting an electric potential to said charged grid;

a grounded grid paralleled to and spaced from said charged grid; and means of varying the spacing between said charged grid and said grounded grid.

9. A system for treating crude oil emulsion for separation of entrained water and gas therefrom comprising:

a heater-treater vessel having a crude oil inlet, a gas outlet, a water outlet, and a crude oil outlet;

a heater means in said heater-treater vessel for heating the crude oil emulsion therein whereby the separation of water and gas from the emulsion is augmented, the separated water falling to the lower portion of the heater-treater vessel and the separated gas rising to the top;

an electric treater vessel having a crude oil inlet, a gas outlet, a water outlet and a crude oil outlet, the crude oil inlet of said electric treater vessel having communication with the crude oil outlet of said heater-treater vessel;

an electric grid system traversing the interior of said electric treater vessel and in the path of fluid flow between said crude oil inlet and said crude oil outlet;

means of imparting an electric potential to said electric grid system whereby an electric field is established through which said emulsion flows;

a first and second thermostat in said heater-treater vessel having selectable communication with said heater means for selectably controlling the temperature of the crude oil emulsion in said heater-treater, the said second thermostat being set to maintain the emulsion at a higher temperature compared to said first thermostat;

a water content probe within said electric treater vessel and adjacent said grid system;

relay means actuated by said water content probe when the percentage of water in the emulsion in said electric treater vessel exceeds a preselected maximum, said relay means upon actuation de-energizing said grid system and concurrently connecting said second thermostat to said heater to raise the temperature of the emulsion in said heater-treater to increase the separation of water from the emulsion.

10. An electric treater according to claim 9 including an electric heating element adjacent said electric grid whereby the temperature of said grid may be elevated to melt any paraffin accumulation thereon.

11. An electric treater according to claim 9 wherein said electric grid system includes:

a charged grid supported to the interior of said vessel in insulated relationship;

an insulated conductor means in the wall of said vessel and connected interiorly of the vessel to said charged grid affording means of imparting an electric potential to said charged grid;

a grounded grid paralleled to and spaced from said charged grid; and means of varying the spacing between said charged grid and said grounded grid.

References Cited

UNITED STATES PATENTS

| | | | |
|---|---|---|---|
| 1,276,387 | 8/1918 | McKibben | 204—305 |
| 2,033,418 | 3/1936 | Eddy | 204—302 |
| 2,412,791 | 12/1946 | Waterman | 204—305 |
| 2,425,355 | 8/1947 | Roberts | 204—305 |
| 1,405,129 | 1/1922 | Harris | 204—305 |

DELBERT E. GANTZ, *Primary Examiner.*

GEORGE J. CRASANAKIS, *Assistant Examiner.*

U.S. Cl. X.R.

204—306, 308; 208—187